Sept. 14, 1937.　　　　　E. D. TILLYER　　　　　2,092,789
GLASS TREATMENT
Filed Sept. 13, 1934
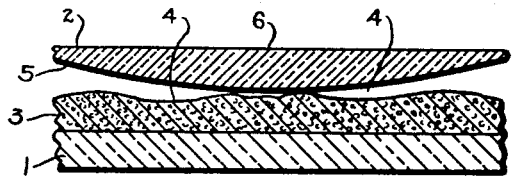
FIG. I
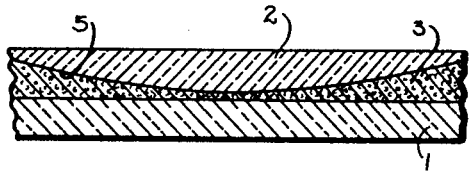
FIG. II
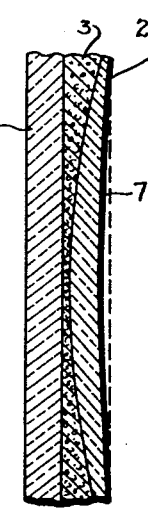
FIG. III
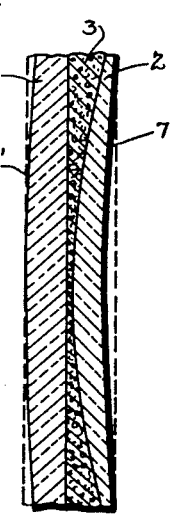
FIG. IV
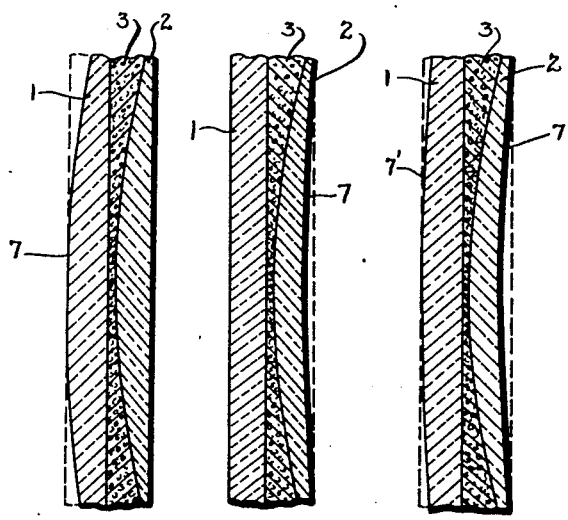
FIG. V
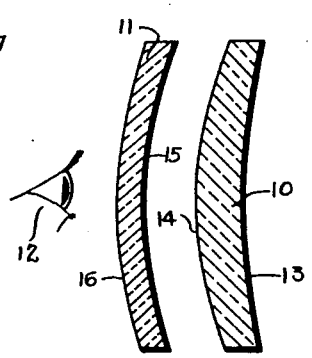
FIG. VI
INVENTOR
Edgar D. Tillyer.
BY Harry H. Styll
ATTORNEY

UNITED STATES PATENT OFFICE 2,092,789

GLASS TREATMENT

Edgar D. Tillyer, Southbridge, Mass., assignor to American Optical Company, Southbridge, Mass., a voluntary association of Massachusetts Application September 13, 1934, Serial No. 743,878

6 Claims. (Cl. 49—81)

This invention relates to improvements in glass treatment and has particular reference to the process of producing strengthened glass and lenses and to the product of such process.

This application is a continuation in part of my applications Serial No. 440,025, filed March 29, 1930, and Serial No. 658,822, filed February 27, 1933.

The principal object of this invention is to provide means of uniting layers of glass with a cement having any desired index of refraction and compensating for the power obtained thereby to produce compound glass, having clear visual characteristics, thereby increasing the range of cements that may be used.

Another object of this invention is to provide simple means of forming compound glass and lenses without air bubbles between the contacting surfaces.

Another object of this invention is to provide means whereby cementitious materials of desirable adhesion qualities may be used without regard to the index of refraction thereof.

Other objects are: to provide a cement having a different dispersion from the glass to compensate for the dispersion of the glass itself and the curves on the outside thereof, to provide means to make certain opaque cements transparent and thus increase the range of usable cements, to provide nonbreakable laminated glass and to provide an increased number of lens surfaces in a lens whereby additional space is provided to incorporate prescriptive corrective elements in the finished lens, and particularly, to provide means whereby corrections for size and shape variance of the eyes may be compensated for.

Other objects and advantages will become apparent from the following description taken in connection with the accompanying drawing, and it will be apparent that many changes may be made in the details of construction, arrangement of parts and steps in the process without departing from the spirit of the invention as expressed in the accompanying claims. I, therefore, do not wish to be limited to the exact details shown and described as the preferred forms only have been shown by way of illustration.

In the drawing:

Fig. I is a diagrammatic sectional view of a step in my improved process.

Fig. II is a diagrammatic sectional view of a further step in the process.

Fig. III is a diagrammatic sectional view of one method of completing the process.

Fig. IV is a diagrammatic sectional view of another method of completing the process.

Fig. V is a diagrammatic sectional view of still another method of completing the process.

Fig. VI is a diagrammatic sectional view of a lens system having the property of changing the size of image without changing its focus.

It is well known that compound glass formed of two or more layers joined together is more inexpensively made by utilizing cement as the joining medium. In the past, however, cemented compound glass has been far from satisfactory where good visual qualities were required as in lenses. The difficulty has been that the choice of cements for uniting the layers of glass has been confined to one or two having substantially the same index of refraction as the glasses and these cements have not been very satisfactory in adhesive qualities. Canada balsam has been widely used for this purpose as it has substantially the same index as ordinary crown glass, but this cement is extremely brittle and after a time it cracks and falls away from the surfaces to which it was united.

Another drawback of prior art compound glass has been that when the cement was placed between the two or more flat surfaces of the layers of glass, air bubbles would form and so destroy the definition and cause a blurring of vision.

It is an object of my invention, therefore, to remove the restriction regarding the choice of cements and make it possible to use any cement having the desired adhesive qualities without regard to the index of refraction. Furthermore, I have provided a process whereby the air bubbles may be removed during the manufacture of the glass and thereby produce a compound glass having clear visual characteristics.

Also, in certain cases it is desirable to increase the number of surfaces of a lens in order that provision can be made of visual corrections which could not be done with the two surfaces of the usual single lens, such as, for example, variance in the size and shape impressions of the eyes, in addition to the usual prior art corrections for sphere, cylinder and prism corrections, an important consideration to persons afflicted with this variance in vision. Also, dispersive or color difficulties may be reduced or eliminated by selecting a cement with a required index or dispersion. Advantages such as these reside in this invention.

Referring to the drawing wherein similar characters of reference denote corresponding parts throughout the several views:

In the prior art the layers of laminated glass were made from flat material and when the cement was placed between the layers, air spaces formed between the cement and the upper layer of glass. As the upper layer of glass was flat, it is obvious that the air was trapped between the layers and bubbles were formed, no matter how much the upper layer of glass was pressed down upon the lower layer.

In Fig. I I have illustrated my improved process. The lower layer of glass 1 is preferably of flat surface. Over this layer of glass 1, I next pour a cement preferably of higher index of refraction than the glass 1. This cement may be heated for several hours until its crystalline structure is removed, which has the effect of clearing a non-transparent or semi-transparent cement and making it transparent. Over this cement I place my second layer of glass 2, but instead of the face which contacts with the cement being flat, I place a curvature 5 thereon. This curvature may be of any desired radius, the only qualification being that it is of sufficient degree to contact with the cement at one point only, as at 6, and so remove the fear of air bubbles forming between the curved face 5 and the cement 3 as the layer 2 is pushed down in place.

As an example of a cement whose crystalline structure may be removed, I have found that the cement "piperine", which is an opaque alkaloid from pepper, will give good results. When piperine is heated for a short time it melts and then crystallizes again and is not usable for the purposes of this invention for it is opaque, but if heated long a long time and/or at a higher temperature, or both, it melts and does not crystallize, but forms an elastic, nonfragile, and clear transparent cement. Other forms of crystal cement react in a similar way. Some of these are vinyl compounds such as vinyl acetate, abietic acid, acrylic esters and similar compounds, cinamic acid, aldehyde-urea compounds and formaldehyde—urea compounds and aldehyde-phenol compounds such as hexamethylene-phenol, etc.

In Fig. I I have illustrated the cement 3 having a wavy contour, as the cement would have when poured on the lower layer of glass 1. As the upper layer of glass 2 is moved towards the lower layer 1, the cement will settle down from the center outwardly and push the air from the spaces 4 outwardly also. When the upper layer of glass 2 has been moved towards the lower layer 1 as far as desired, the appearance of the compound glass at this stage will be somewhat as shown in Fig. II.

Inasmuch as I have placed the curvature 5 upon the upper layer 2 and that the indices of the cement and the glass are different, it will be obvious that some compensation should be made for the power which has been formed therein.

In order to compensate for this power and provide a glass having plano or clear visual characteristics, I next preferably grind a curve on one surface of the outside faces of the compound glass. As an example of the simple computations involved in determining the curvature to be placed upon the outside, I can proceed as follows:

Assuming that after the cement of higher index than the glass has been heated for several hours to remove its crystalline structure, as has been previously set forth, and that this index is about 1.6, whereas the index for a crown glass portion is 1.5, and the curvature 5 has a radius of 0.1 meters, then the focal power will be $$\frac{1.6-1.5}{0.1}=1 \text{ diopter}$$

Then, in order to obtain plano power in the compound glass, I surface a minus 1 diopter curve on the crown glass, which curve is equivalent to a minus 0.5 meter radius. It will be obvious that as the indices of refraction change from the use of various glasses and cements, so the radius of the curvatures will change and the foregoing example is for the purposes of illustration only.

This curvature may be surfaced upon the outside of the layer 1 as shown by the numeral 7 in Fig. III. It will be apparent that there is no restriction as to the side upon which the curvature 7 is surfaced, and as shown in Fig. IV, this curvature 7 may be placed upon the opposite side or upon the layer 2. As a further modification I have shown in Fig. V a pair of curvatures 7', which are surfaced upon both layers of glass and are computed to the equivalent to a single curvature upon one layer.

It will also be apparent that this process is not confined to forming plano glass, but that any desired curvatures may be surfaced upon the layers 1 and 2.

If the glass is to be used for lenses, windshields, or other articles where strength to resist shocks must be combined with good visual qualities, the strengthened compound glass may be cut to desired shape, surfaced to any curvature, and polished to any degree required. A wide variety of uses will be found for this improved compound glass, inasmuch as the restrictions regarding the choice of cement have been removed. A cement may be chosen for its adhesion qualities and freedom from brittleness, without regard to the index of refraction, as this last quality may be compensated for, as set forth in the foregoing.

It will be noted that a lens having four face surfaces instead of two may be made in this way. One of the layers may be ground and finished in the usual way to provide visual corrections for sphere, cylinder, and prism, as in the old prior art single lenses, and the other layer may be surfaced and related to the first layer by the proper separation to provide for a change in the size of image without change in the focus thereof, as computed by well known optical lens calculations, and in this way a lens for correcting size and shape variances of the eyes may be produced.

In Fig. VI there is illustrated in section a lens system comprising a prescription lens 10 which lens is made in the usual prior art way to correct refractive errors in sphere, cylinder, and prism, the usual prior art corrections, and a size lens 11, which has the property of changing the magnification of the lens 10 but not its focus. The lens 11 operates on the optical principle that a flat parallel sided plate has neither power nor magnification, but if said plate is bent in an arc, magnification is introduced without change of focus. When the lens 11 has the convex side next to the eye 12 it increases the size; when the concave side is next to the eye it decreases the size of image. The optical effect of the lens system also depends on the distance between the two lenses 10 and 11, and the distance from the eye. It will be noted that a lens of this character has the four lens surfaces 13, 14, 15 and 16, so that the optical relationship may be regulated by using all four of these surfaces in any desired way to produce the optical result desired. These surfaces and the separation of the parts will allow for any desired regulation of size and shape differences of the eyes. Where there is only a question of size difference involved, of course, only the size lens is required, but in the majority of cases the size element will be used with the other refractive elements usual in eye correction.

One of the difficulties of a size lens is its size and bulk; my invention provides a simple and inexpensive means of making these lenses in a unitary form.

Lenses for size and shape variance are coming into use and provide relief that no other form of lens can give. This invention provides a simple, compact and inexpensive way to produce these lenses.

By properly selecting the index or dispersion of the cement, compensation can be made for dispersion and color troubles, being of particular importance in lenses.

This invention makes available the very inexpensive process of cementing glasses together in order to strengthen them as opposed to the more expensive process of fusing.

The foregoing description will clearly show that simple means have been employed to carry out the objects of the invention, and that the article produced is in every way superior to those produced by the restricted prior art method, inasmuch as a much wider field for the use of cements has been made available, and compensations for dispersions, refractive index and optical corrections can be made particularly for variance in the size and shape impressions of the eyes, etc.

Having described the invention, I claim:

1. The process of making laminated glass comprising heating an opaque crystalline alkaloid from pepper at a temperature high enough, and for a sufficient length of time to melt it and to remove its crystalline structure so that it will not re-crystallize on cooling and will be transparent when cool and placing the said treated alkaloid between layers of glass to cement the glass layers together.

2. The process of making laminated glass comprising heating piperine at a relatively high temperature for a length of time whereby it will melt and will not re-crystallize on cooling and will be transparent when cool and placing the said treated piperine between layers of glass to cement the layers of glass together.

3. The process of making laminated glass comprising selecting an alkaloid which is normally of a nontransparent light diffusing crystalline nature which may be rendered transparent by heating and which when heated will lose its tendency to crystallize, heating said alkaloid to a temperature sufficiently high and for a length of time sufficient to cause a molecular rearrangement which will overcome the tendency of said alkaloid to crystallize and which will render it transparent when cool and placing the said treated alkaloid between layers of glass to secure the said layers together.

4. The process of making a laminated glass article comprising adhesively uniting together surfaces of separate pieces of glass of known indices of refraction with a plastic substance of a known index of refraction by pressure, one of said surfaces being of a different degree of curvature than the other, said surfaces being so related that their inner portions are nearer together than the outer portions thereof, whereby when said surfaces are being united by pressure air bubbles entrapped in said substance and between said surfaces will be progressively forced outwardly from between said surfaces, and altering one of the surfaces of at least one of said pieces to compensate for the difference in curvature of the united surfaces and for the indices of refraction of the materials in order to produce a glass structure having substantially the focal power desired.

5. The process of making a lens of predetermined optical properties comprising selecting a substance which is normally of a non-transparent light diffusing crystalline nature which may be rendered transparent by heat treatment, and which when so treated will lose its tendency to crystallize and be of a known index of refraction, heating said substance to a temperature sufficiently high and for a length of time sufficient to cause a molecular rearrangement which will overcome the tendency of said substance to crystallize and which will render it transparent when cool, pressing surfaces of a plurality of pieces of glass of known indices of refraction into united relation with said treated substance, said united surfaces having different degrees of curvature to facilitate the elimination of air bubbles when uniting said surfaces, and forming an optical surface on said composite blank to compensate for the difference in curvature of the united surfaces and for the indices of refraction of the materials so as to give the desired optical characteristics.

6. As a new article of manufacture, a laminated glass structure comprising a plurality of pieces of glass of known indices of refraction having finished surfaces held in fixed spaced relation by a substance which is normally of a nontransparent light diffusing crystalline nature which may be rendered transparent by heat treatment, and which when so treated will lose its tendency to crystallize and be of a known index of refraction, the contiguous surfaces of said layers having different degrees of curvature and so related to each other to cause air bubbles entrapped in said substance and between said substances to be forced therefrom when said pieces are united, at least two of the surfaces of said pieces being controlled to compensate for the difference in surface curvatures of the contiguous surfaces and indices of refraction of the materials to give the desired optical characteristics.

EDGAR D. TILLYER.